(12) United States Patent
Brainard et al.

(10) Patent No.: US 7,612,541 B1
(45) Date of Patent: Nov. 3, 2009

(54) CHARGE-PUMP VOLTAGE CONVERTER

(75) Inventors: John P. Brainard, Albuquerque, NM (US); Todd R. Christenson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 248 days.

(21) Appl. No.: 11/835,046

(22) Filed: Aug. 7, 2007

(51) Int. Cl.
*H02N 1/00* (2006.01)
(52) U.S. Cl. ........................................ 322/2 A; 310/309
(58) Field of Classification Search ................. 310/309; 322/2 A
See application file for complete search history.

(56) References Cited

U.S. PATENT DOCUMENTS

| | | | | |
|---|---|---|---|---|
| 2,644,903 A * | 7/1953 | Lehrer | | 310/309 |
| 2,671,177 A * | 3/1954 | Robinson et al. | | 310/309 |
| 2,702,353 A * | 2/1955 | Herson et al. | | 310/309 |
| 2,756,352 A * | 7/1956 | Felici et al. | | 310/309 |
| 2,831,988 A * | 4/1958 | Morel | | 310/309 |
| 2,836,785 A * | 5/1958 | Neubert | | 322/2 A |
| 3,192,414 A * | 6/1965 | Reusser | | 310/309 |
| 3,324,315 A * | 6/1967 | Morel | | 310/309 |
| 4,595,852 A | 6/1986 | Gundlach | | 310/309 |
| 4,789,802 A * | 12/1988 | Miyake | | 310/309 |
| 4,897,592 A * | 1/1990 | Hyde | | 322/2 A |
| 5,506,491 A * | 4/1996 | Ford | | 322/2 A |
| 6,771,002 B2 * | 8/2004 | Jones | | 310/309 |
| 2008/0186124 A1 * | 8/2008 | Schaffer et al. | | 336/200 |
| 2009/0066298 A1 * | 3/2009 | Post | | 322/2 A |

* cited by examiner

*Primary Examiner*—Nicholas Ponomarenko
*Assistant Examiner*—Pedro J Cuevas
(74) *Attorney, Agent, or Firm*—Carol I Ashby

(57) ABSTRACT

A charge-pump voltage converter for converting a low voltage provided by a low-voltage source to a higher voltage. Charge is inductively generated on a transfer rotor electrode during its transit past an inductor stator electrode and subsequently transferred by the rotating rotor to a collector stator electrode for storage or use. Repetition of the charge transfer process leads to a build-up of voltage on a charge-receiving device. Connection of multiple charge-pump voltage converters in series can generate higher voltages, and connection of multiple charge-pump voltage converters in parallel can generate higher currents. Microelectromechanical (MEMS) embodiments of this invention provide a small and compact high-voltage (several hundred V) voltage source starting with a few-V initial voltage source. The microscale size of many embodiments of this invention make it ideally suited for MEMS- and other micro-applications where integration of the voltage or charge source in a small package is highly desirable.

3 Claims, 6 Drawing Sheets

CHARGE-PUMP VOLTAGE CONVERTER

The United States Government has rights in this invention pursuant to Department of Energy Contract No. DE-AC04-94AL85000 with Sandia Corporation.

BACKGROUND OF THE INVENTION

This invention relates to a device for converting the voltage from a low-voltage source to a high voltage. There is an unmet need for a charge-pump voltage converter that can produce moderate voltages (a few kV or less) from low-voltage inputs such as may commonly occur in microelectromechanical systems (MEMS). Traditional charge-pump voltage converter designs are not compatible with fabrication on the same dimensional scale as MEMS devices, and are therefore not able to address this need.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a charge-pump voltage converter for converting a low voltage provided by a low-voltage source to a higher voltage. Charge is inductively generated on a transfer rotor electrode during its transit past an inductor stator electrode and subsequently transferred by the rotating rotor to a collector stator electrode for storage or use. Repetition of the charge transfer process leads to a build-up of voltage on a charge-storage device such as, for example, a capacitor. Connection of multiple charge-pump voltage converters in series can generate higher voltages, and connection of multiple charge-pump voltage converters in parallel can generate higher currents. Microelectromechanical (MEMS) embodiments of this invention are possible, providing a small and compact high-voltage (several hundred V) voltage source starting with a few-V initial voltage source. The microscale size of many embodiments of this invention make it ideally suited for MEMS- and other micro-applications where integration of the voltage or charge source in a small package is highly desirable or essential. The very high rotation velocities (for example, 100,000 rpm) that can be achieved with MEMS-scale components can enable embodiments of this invention to produce voltages (for example, on the order of kilovolts) and currents sufficient for many applications where the maximum size of a voltage source may be a limiting criterion.

Figure 1:
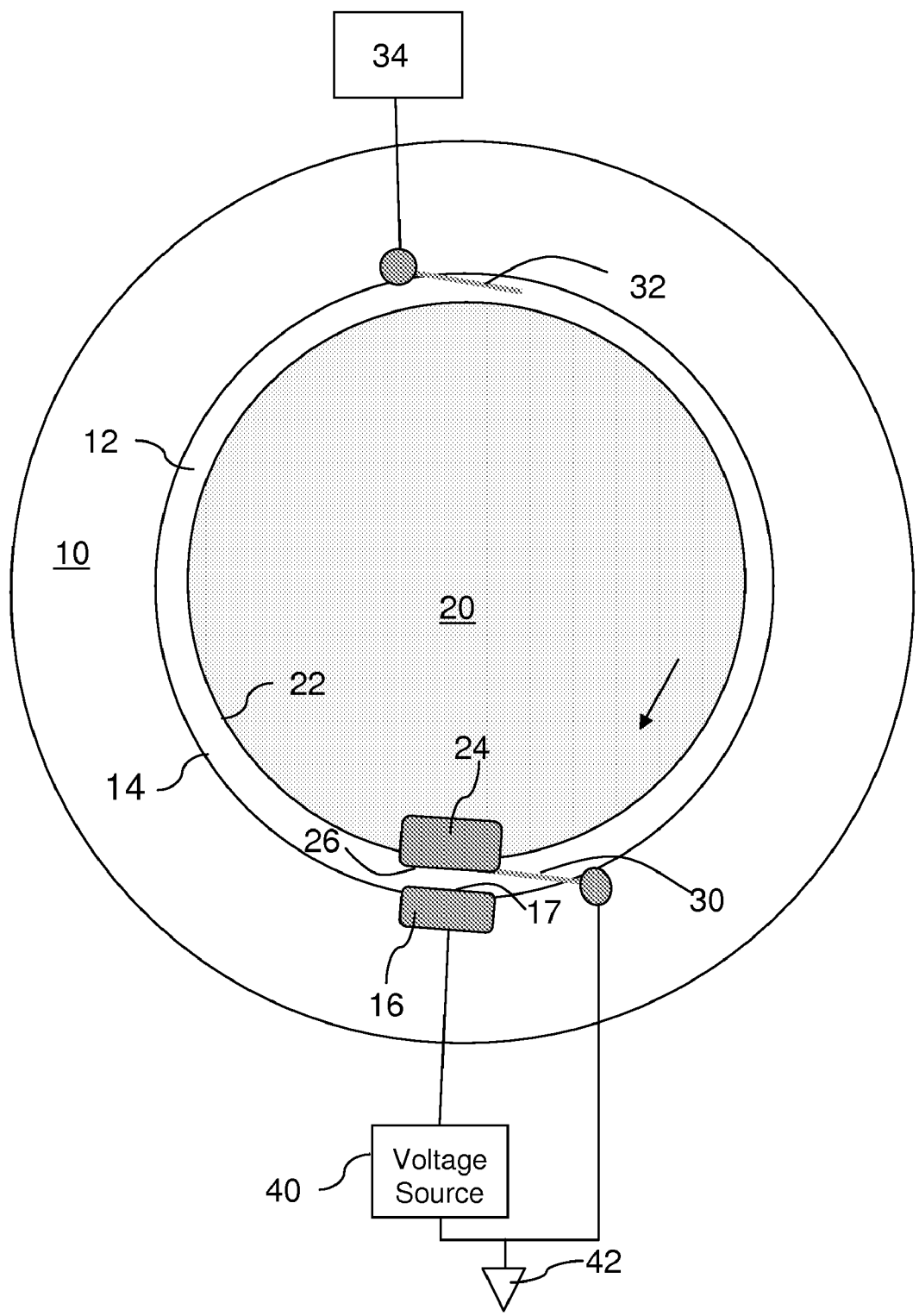
FIG. 1 illustrates an embodiment with a single inductor electrode, a single transfer electrode, and a single charge-receiving means.

One embodiment of this invention is illustrated in FIG. 1. FIG. 1 is not drawn to scale. A rotor 20 is rotatably positioned within a rotor cavity 12 in a stator 10. The geometric shape of the stator can be cylindrical or noncylindrical. The inner surface 14 of the stator is insulating (not electrically conducting), thereby enabling electrical isolation of the various electrodes and contacts at appropriate times in the charge-transferring rotation cycle. In some embodiments, the circumferential surface 22 of the rotor between any rotor-mounted electrodes is also insulating. The rotor 20 can be mounted on a shaft that can be operably attached to a means for rotating, such as, for example, a motor or a set of gears configured to produce rotation of the shaft. An inductor electrode 16 is mounted on the stator. The inductor electrode can be electrically connected to a voltage source 40, which establishes an electrical potential at the inductor electrode 16. The voltage source may be a battery, a power supply, or some other means known to those of skill in the art for applying a voltage to the inductor electrode. The inductor electrode 16 need not be connected to a voltage source; spontaneous charge polarization of the surface of the inductor electrode can also be used to establish a charge on the inducing surface 17 of the inductor electrode 16. A grounding means 30 such as, in some embodiments, a flexible contact is also affixed to the stator in a position that causes it to contact the transferring surface 26 of the rotor-mounted transfer electrode 24 as rotation of the rotor 20 rotates the transfer electrode 24 into position across a gap between the rotor and stator where the potential on the inductor electrode can induce charge at the transferring surface 26 of the transfer electrode 24. The grounding means can be a flexible electrical contact such as, in some embodiments, a spring contact, a conducting brush, a hinged contact, or another type of flexible contact that can connect the transfer electrode momentarily to ground or to a common 42 with the voltage source. A hinged contact may be flexed into electrical contact with the grounding means by a resilient device, such as, for example, a spring or springy material, or by magnetic attraction between the grounding means and the hinged contact or a magnetic device in contact with the hinged contact. In embodiments where the voltage source 40 is providing a positive voltage, the connecting to the common 42 or grounding of the transfer electrode 24 places the transfer electrode at a potential that is negative relative to the inductor electrode 16. In some embodiments, it may be desirable to increase the capacitance between the inductor electrode 16 and the transfer electrode 24 to achieve greater charge transfer by either decreasing the spacing and/or increasing the overlapping area between the electrodes. For example, greater area can be achieved by incorporating grooves in the electrodes such that they can slide through each other as the rotator rotates; interdigitated comb electrodes are one example of such a structure that may be used in some embodiments. An excess of electrons is induced on the transfer electrode and the electrons are transferred by further rotation of the rotor to the charge-transfer means 32, from which the transferred charge can be received by a charge-receiving means 34 such as, for example, a capacitor, or a device that stores or uses the charge as it is provided. In some embodiments, the charge-transfer means 32 is a flexible contact; different embodiments can employ a flexible contact that is a spring contact, a brush contact, or a hinged contact. A hinged contact may be flexed into electrical contact with the grounding means by a resilient device, such as, for example, a spring or springy material, or by magnetic attraction between the grounding means and the hinged contact or a magnetic device in contact with the hinged contact.

When the charge-receiving means is a capacitor, large voltages may be developed across the capacitor by the accumulating charge when the capacitance is sufficiently small, since $V=q/C$ where V is the voltage, q is the charge, and C is the capacitance. Repeated transfer of charge to a capacitor by sequential charge transfers as the rotor rotates provides a high-voltage output source.

Figure 2:
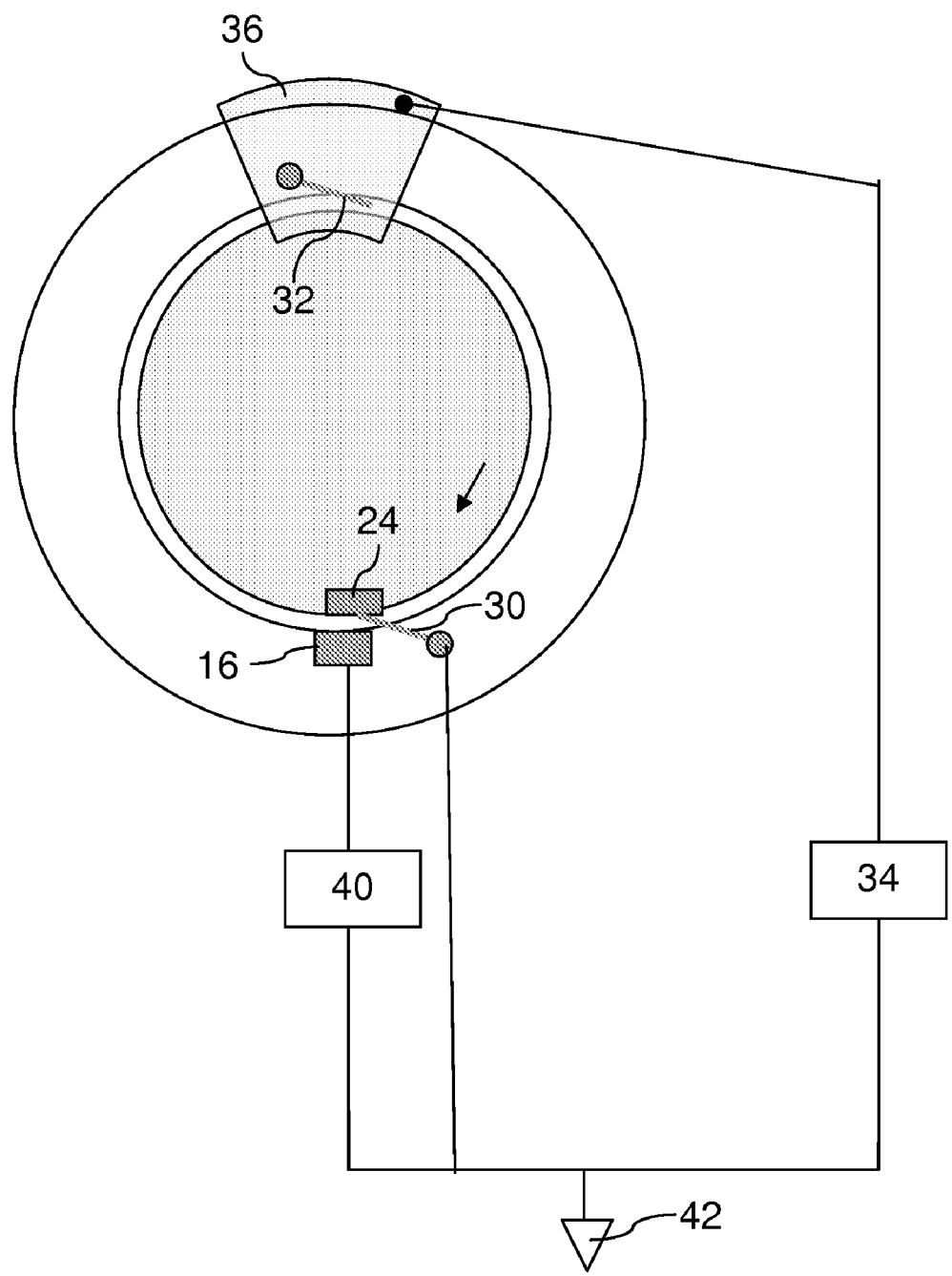
FIG. 2 illustrates an embodiment with a single inductor electrode, a single transfer electrode, and a single charge-receiving means comprising a flexible contact and a shield (Faraday cage) that is electrically connected to the flexible contact.

In some embodiments, the charge-receiving means comprises a contact and a shield or Faraday cage. One such embodiment is illustrated in plan view in FIG. 2. The charge transfer means 32 is conductively connected to a shield 36, which is conductively connected to the charge-receiving means 34.

Several embodiments with different shield configurations are illustrated in FIG. 3. When no shield is employed, the charge receiving means charges up to a value approximately equal in magnitude to the input voltage but opposite in sign. For embodiments in which a shield is conductively connected to the charge-transfer means, the voltage at the charge-receiving means can be increased over that of the input voltage. For example, in one embodiment with an input voltage of +10 V, the output voltage obtained with the stray circuit capacitance of a few pF (stray capacitance without a capacitor in series between the charge-transfer means and the common with the voltage supply) rose to −100 V in approximately 8 minutes with a rotational speed of approximately $10^4$ rpm. With a 22.5 nF capacitor as the charge-receiving means, an input voltage of +20 V produced an output voltage of −200 V after 210 minutes.

Figure 3A:
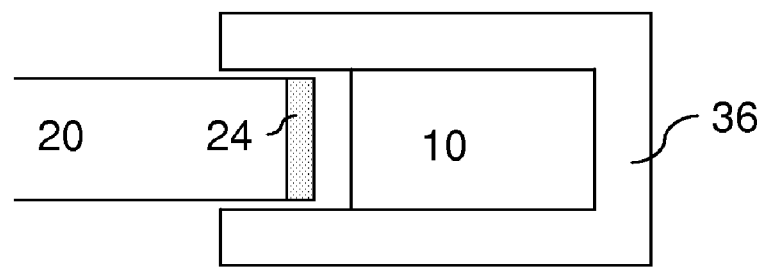
FIG. 3 illustrates side views of three embodiments with different shield configurations.
Figure 3B:
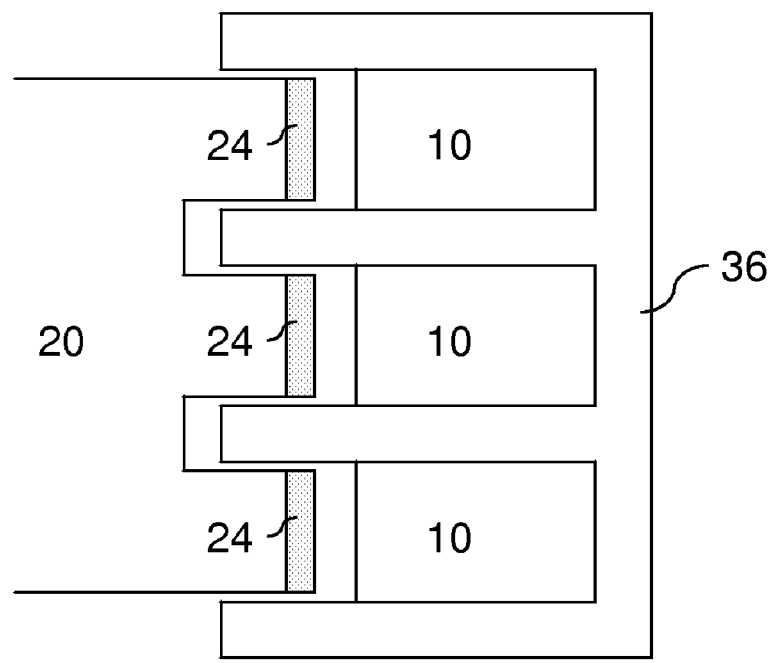
Figure 3C:
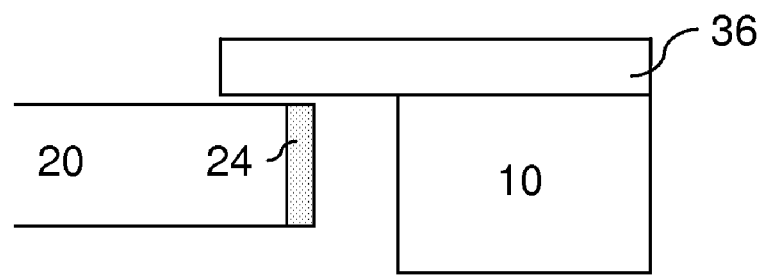
Figure 4:
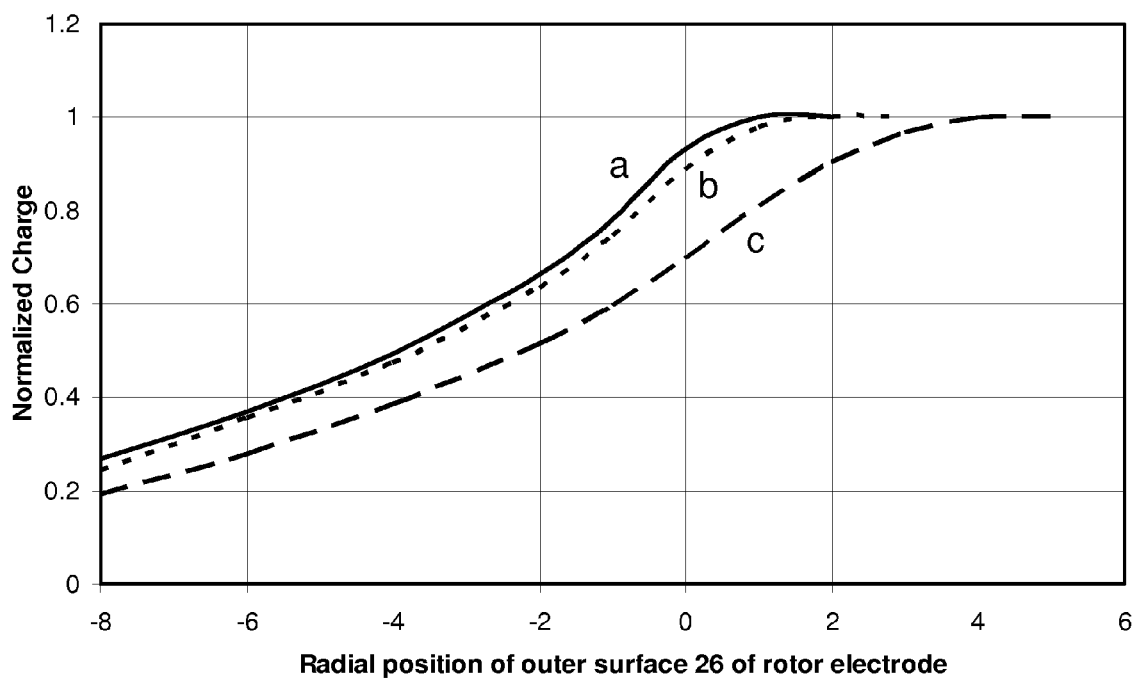
FIG. 4 illustrates the three configurations of a transfer electrode (rotor electrode) and a shield and the normalized charge as a function of the position of the outer surface of the rotor electrode with respect to single-sided and double-sided shields, where 1 unit equals the width of a double-sided shield slot.
Figure 4:
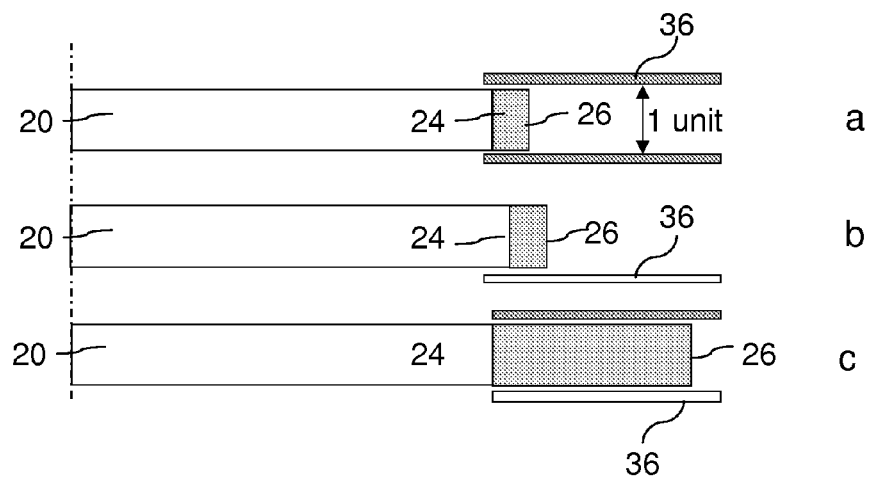

FIGS. 3a through 3c illustrate some embodiments with different shield configurations. For clarity of illustration, FIGS. 3a-3c show the rotor electrode 24 and the shield 36; the charge-transfer means 32 is not illustrated in these figures. The rotational axis is to the left side of the figure and is not shown. Embodiments of the types illustrated in FIGS. 3a and 3b have a shield on both sides of the rotor electrode. FIG. 3c illustrates an embodiment with shield on one side only. In FIG. 3a, a single electrode is illustrated. In FIG. 3b, a multiplicity of rotor electrodes that are co-rotating about the rotor axis are illustrated. The multiplicity of electrodes can be mounted on a single rotor (as shown in FIG. 3b) or mounted on a multiplicity of rotors that are mounted on the same shaft (not shown in the figure). These correspond to rotor electrode/shield configurations a and c of FIG. 4 wherein the calculated normalized charge transfer as a function of the electrode type and position with respect to the shield edge is presented. The rotational axis is on the left side of the figure. Zero corresponds to direct alignment of the outer edge of the rotor electrode with the inner edge of the shield. Radial units are in terms of the axial width of the rotor electrode. As the position of the outer end surface of the rotor electrode approaches the edge of the shield, charge transfer efficiency is increased. As the rotor electrode edge is located further into or adjacent to the shield, the relative efficiency in terms of normalized charge transfer increases. FIG. 4 shows the position of the transfer electrode 24 for nearly maximum charge transfer in some embodiments. Charge is more effectively transferred with a radially thinner rotor electrode than with a thicker rotor electrode, as is shown by comparison of case a and c in FIG. 4. This allows the reduction of the extent of the shield and an increase in the rotor diameter and/or reduction in the stator diameter. Comparison of the normalized charge for the double-sided shield embodiment in case a with a single-sided shield embodiment in case b of FIG. 4 shows that incorporating a shield on a single side of the rotor electrode can perform almost as well as the more complex double-sided embodiment of case a. Over 90% of the charge may be transferred under conditions where the shield just covers the transfer electrode. Minimization of the shield can be employed to maximize the charge separation to obtain a higher voltage for a given rotor diameter. Reduction of the radial height of the transfer electrode can also increase charge separation (case a vs. case c of FIG. 4).

More efficient charge separation occurs when the charge-transfer means, such as a flexible contact, is inset a distance from the shield edge that is approximately equal to the width of the spacing between the sides of a double-sided shield, when the rotor is a close fit between the two sides of the shield (case a of FIG. 4) and the shield is approximately 2-3 times the angular width of the rotor electrode as measured from the rotor axis. However, embodiments with other shield dimensions and rotor electrode alignments, including single-sided shield embodiments such as that shown in case b of FIG. 4, can work well and are included as embodiments of this invention.

Figure 5:
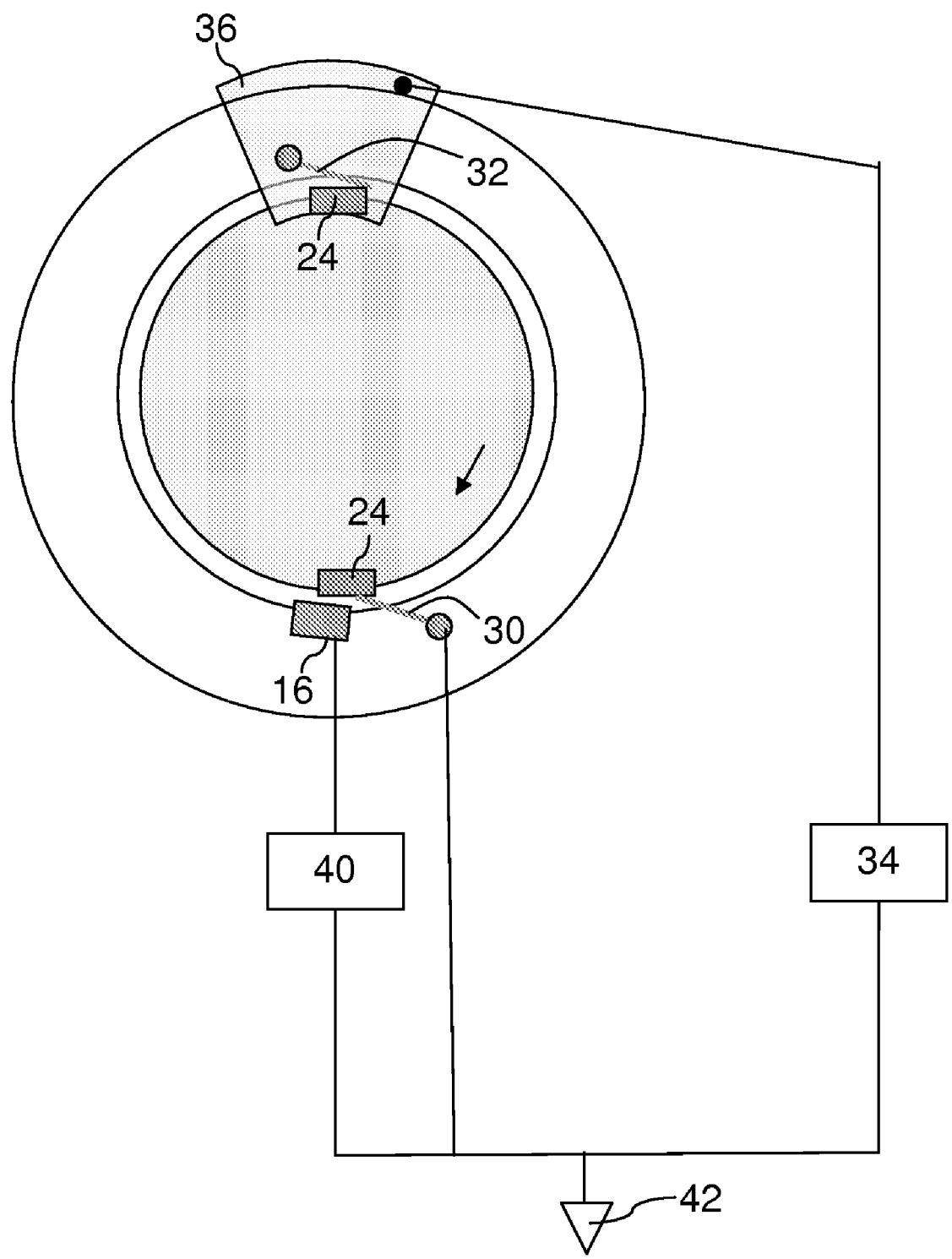
FIG. 5 illustrates an embodiment where a plurality of transfer electrodes are positioned on the rotor.

The incorporation of a plurality of transfer electrodes 24 approximately in a plane on the rotor can increase the rate of accumulation of charge at the charge-receiving means as each transfer electrode is inductively charged and then rotated into position for transferring its charge to the charge transfer means 32 which in some embodiments is conductively attached to the shield 36. This is illustrated for a 2-electrode case in FIG. 5. The number of transfer electrodes can be varied and the upper number is limited primarily by the constraint of sufficient separation from each other on the rotor to remain electrically insulated from each other. FIG. 3b illustrates an embodiment where a plurality of transfer electrodes are located on the rotor but in different planes. Multiplicity of transfer electrodes both in given plane and in different planes can be employed in various embodiments to increase current or voltage output as desired.

Figure 6:
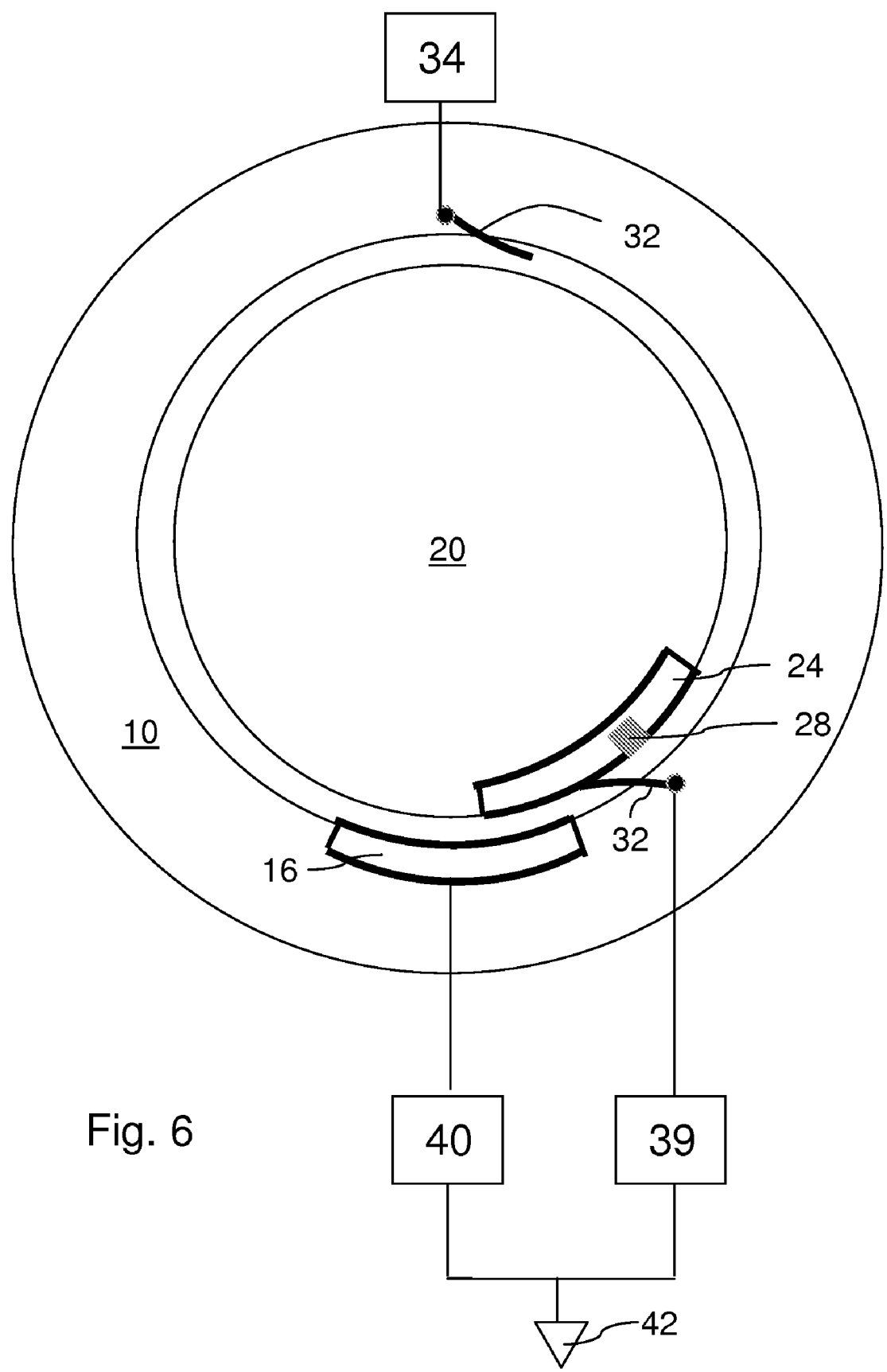
FIG. 6 illustrates an embodiment where an interruption of the conducting surface of the rotor electrode serves to provide a voltage spike to break through surface contaminants.

When operating at low voltage, oxides or thin organic contaminant layers, such as oil layers, on the electrode surfaces can act as an electrical resistance barrier. The few volts provided by the low voltage supply may not be sufficient to permit conduction through such contaminants. FIG. 6 illustrates an approach to reducing this effect. The electrodes illustrated in FIG. 6 are not to scale but are drawn on a larger scale for illustrative purposes. One or more slots 28 in the surface of the transfer electrode 24 oriented out of a plane perpendicular to the axis of rotation of the rotor can momentarily interrupt the current flow and produce an inductive voltage spike of a few tens of volts, which is sufficient to break through surface contaminants. The intrinsic induction of the wiring between the flexible contact 32 and the common 42 is sufficient in some embodiments, but this effect can be enhanced if an inductor 39 is placed in series with the flexible contact 32 and the common 42. An inductor of $10^{-6}$ H is sufficient to produce this desired effect. The inductive spike in voltage can be used to increase charge transfer between the inductor electrode 16 and the transfer electrode 24. In some embodiments the slot may be filled with a non-conducting material with a high dielectric constant; the function of the slot or insulating material is to interrupt current flow and other means for effecting such an interruption may be used in additional embodiments. In some embodiments, one or more raised textural elements, such as a bump, on the transfer electrode 24 may cause the contact 32 to bounce. Such structures can cause an inductive spike that can be used to enhance charge transfer to the rotor electrode. In one embodiment, this can be achieved by incorporating on the rotor on the order of 500 rotor electrodes on a 1-mm diameter rotor that is rotating at a rate on the order of 100,000 rpm. The individual electrodes would be on the order of a few micrometers wide separated by a few micrometers around the perimeter of the rotor. The fabrication of such embodiments using MEMS technology is within the capability of the MEMS art.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A charge-pump voltage converter comprising:
   a stator comprising a rotor cavity, the rotor cavity having an insulating inner surface;
   a rotor rotatably mounted in the rotor cavity, the rotor having an insulating circumferential surface and having means for connecting to a rotatable shaft;
   at least one inductor electrode mounted on the insulating inner surface of the rotor cavity and having an inducing surface;
   at least one transfer electrode mounted on the insulating circumferential surface of the rotor and having a transferring surface, a separation of the at least one inductor electrode and the at least one transfer electrode being suitable for induction of charge by the inductor electrode on the transfer electrode when a portion of the inducing surface is radially aligned with a portion of the transferring surface;
   grounding means for connecting the at least one transfer electrode to a common for a portion of time while within an induction distance from the inductor electrode, wherein the transfer electrode has at least one contact-interruption means oriented out of a plane perpendicular to an axis of rotation of the rotor, the contact-interruption means serving to momentarily interrupt current flow between the transfer electrode and the grounding means as the transfer electrode rotates past the grounding means; and
   charge-transfer means for transferring charge from the transfer electrode to a charge-receiving means.

2. The charge-pump voltage converter of claim 1, wherein the at least one contact-interruption means comprises at least one of a slot, an insulating material in a depression in the transfer electrode, and a raised textural element.

3. The charge-pump converter of claim 1, further comprising an inductor connected in series between the grounding means and the inductor electrode.

* * * * *